United States Patent
Vapaakoski et al.

(12) 
(10) Patent No.: US 6,570,767 B1
(45) Date of Patent: May 27, 2003

(54) CARD ADAPTER

(75) Inventors: Simo Vapaakoski, Tampere (FI); Lauri-Pekka Alanko, Tampere (FI); Mika Häkkinen, Tampere (FI); Jari-Pekka Heikkilä, Lempäälä (FI)

(73) Assignee: Nokia Mobile Phones Ltd., Espoo (FI)

( * ) Notice: Subject to any disclaimer, the term of this patent is extended or adjusted under 35 U.S.C. 154(b) by 490 days.

(21) Appl. No.: 09/634,408

(22) Filed: Aug. 9, 2000

(30) Foreign Application Priority Data

Aug. 10, 1999 (FI) ................................................ 991700

(51) Int. Cl.$^7$ ................................................ H05K 1/14
(52) U.S. Cl. ........................ 361/737; 361/686; 361/685; 257/679; 710/301
(58) Field of Search ................................ 361/737, 681, 361/686, 684, 685, 748; 710/301, 161; 439/59; 257/679

(56) References Cited

U.S. PATENT DOCUMENTS

| | | | |
|---|---|---|---|
| 5,155,663 A | * 10/1992 | Harase | 361/684 |
| 5,361,061 A | 11/1994 | Mays et al. | 340/825.44 |
| 5,628,055 A | 5/1997 | Stein | 455/89 |
| 5,809,115 A | 9/1998 | Inkinen | 379/93.05 |
| 5,889,649 A | * 3/1999 | Nabetani et al. | 361/684 |
| 5,918,163 A | 6/1999 | Rossi | 455/90 |
| 6,122,175 A | * 9/2000 | Shieh | 361/737 |
| 6,224,391 B1 | * 5/2001 | Horie et al. | 439/64 |
| 6,330,151 B1 | * 12/2001 | Bates, III | 361/686 |

FOREIGN PATENT DOCUMENTS

| | | |
|---|---|---|
| EP | 0 658 851 A3 | 6/1995 |
| WO | WO 96/03707 | 2/1996 |

* cited by examiner

*Primary Examiner*—David Martin
*Assistant Examiner*—Hung Bui
(74) *Attorney, Agent, or Firm*—Perman & Green, LLP

(57) ABSTRACT

The invention relates to a card adapter which is arranged for placing and connecting a separate expansion card (C), such as a card-like wireless communication device, to an expansion card interface of an electronic device, and which card adapter (A) comprises a first end (A1) provided with first connector means (1) for connecting to the electronic device, a second end (A2) provided with a space (3) for placing the expansion card (C) into said card adapter (A), and second connector means (2) for connecting the expansion card (C) placed in said space (3) to said card adapter (A). The second connector means (2) are arranged to move along with the expansion card (C) connected thereto, when said expansion card (C) moves into different functional positions (P1, P2).

12 Claims, 5 Drawing Sheets

CARD ADAPTER

The present invention relates to a card adapter according to the preamble of claim 1. The invention also relates to a method according to the preamble of claim 10 for placing and connecting an expansion card to an electronic device. The invention also relates to a card-like wireless communication device according to the preamble of claim 12.

According to prior art, various electronic devices, such as portable personal computers (PC), PDA devices (Personal Digital Assistant), and also cameras are often equipped with an expansion card interface, to which a standardized expansion card can be connected. The interfaces are typically slot-like recesses extending inside the device, into which recesses the card is pushed, the card being typically fully accommodated therein. These expansion cards are intended to form a functional unit with the PC. The expansion cards may also contain radio parts of a wireless communication device including an antenna, wherein the PC can, by means of this card-like wireless communication device, communicate with other devices or with a communication network, e.g. the GSM network (Global System for Mobile Communication). The antennas placed in the cards are used for the transmission and reception of radio-frequency signals, and the signals are transmitted between the radio part and the antenna of the wireless communication device typically by means of conductors and connectors.

One known expansion card is the PC card according to the PCMCIA standard (Personal Computer Memory Card International Association). The PC cards are adapted to be fully inserted in the PC, but so-called extended PC cards are longer than ordinary PC cards. These extended PC cards are partly placed outside the PC, wherein the thickness and design of the PC cards can vary in this part to be placed outside the PC. In a way known per se, this part also accommodates the separate antenna for the wireless communication device.

Figure 1:
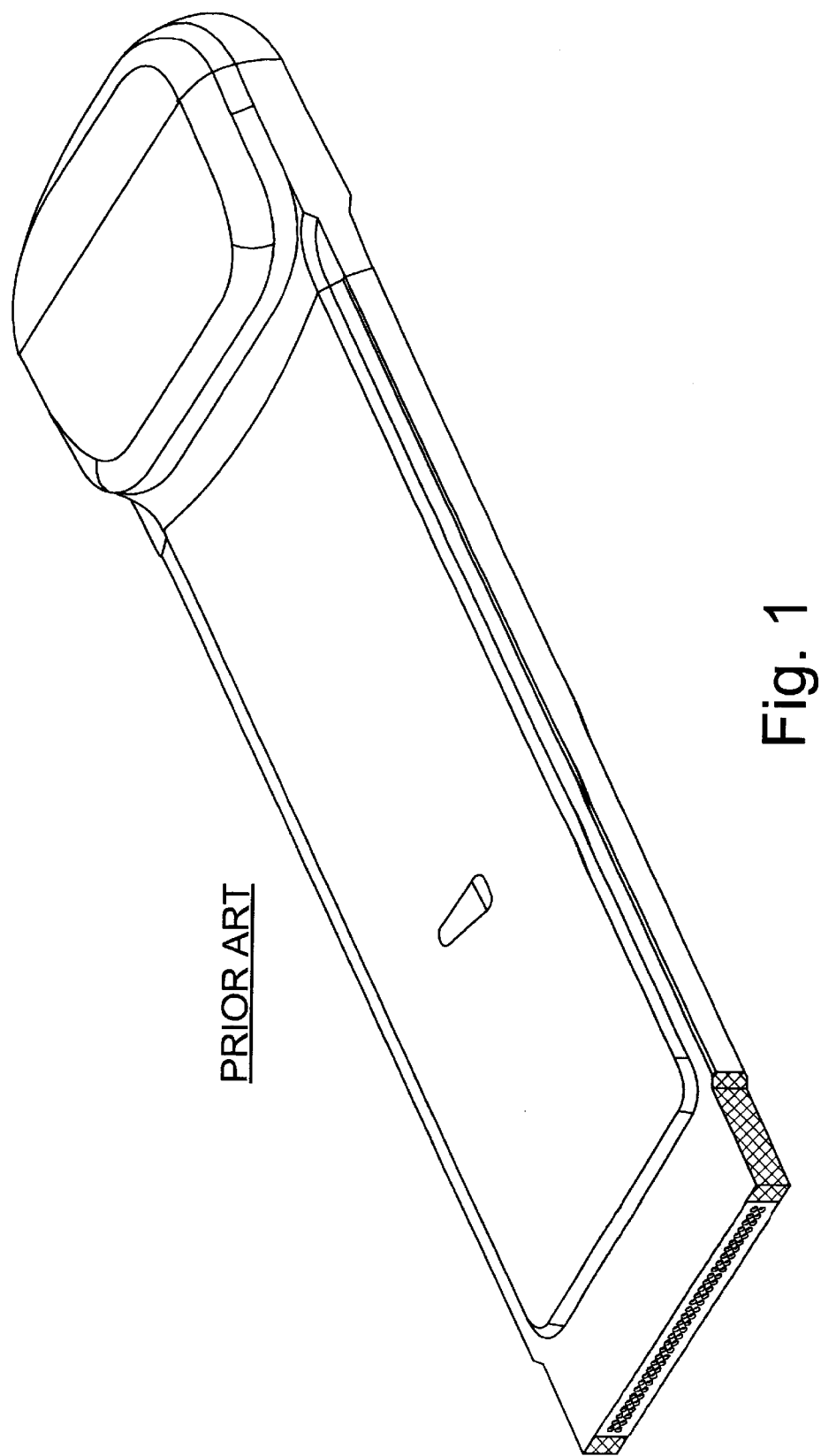

One known card-like wireless communication device which comprises a transceiver with its antenna is the Nokia Cellular Card Phone, i.e. a card phone that can be connected to expansion card interfaces of types II and III of the PC card complying with the PCMCIA standard. One embodiment of the card phone of prior art is shown in FIG. 1, and the operation of the card phone is described in more detail e.g. in patent publication U.S. Pat. No. 5,809,115. In the card phone, the antenna part comprising the antenna is placed outermost in the part located outside the PC device, this part being connected to the card-like part of the card phone that is placed at least partly inside the expansion card interface. Other known card-like wireless communication devices are disclosed in patent publication U.S. Pat. No. 5,628,055, wherein a separate turnable antenna can be connected to the end of the card, and in U.S. Pat. No. 5,361,061, wherein a foldable antenna is pivoted at the end of the extended card on its upper surface.

Other known expansion cards include e.g. a so-called CompactFlash (CF) card complying with the CFA standard (Compact Flash Association). For example for these CF cards, there are also adapters of the size of the PCMCIA card, in which the CF card is placed in a detachable manner for the PCMCIA interface. By means of said adapters it is possible to connect a card of a different size, complying with another card standard to a expansion card interface equipped for a card standard of a particular size. In the most straightforward case, the adapter is provided with first connector means which are compatible with the connector means of the expansion card interface, and second connector means which are compatible with the expansion card to be adapted. In addition to this, the adapter is equipped with conductor means for connecting the connector means electrically to each other to transmit signals between the connector means. In some adapters there are also electric components, such as IC circuits fixed on a circuit board, by means of which the internal function of the card can be arranged to correspond to the function of the expansion card interface. When the card adapter and the expansion card, for example a card complying with the CFA standard, are connected together, they constitute a card-like structure complying, at least with respect of its physical dimensions, with a standard, e.g. the PCMCIA standard, and comprising connector means of the correct type.

Also known are expansion cards for a wireless local area network (WLAN), and other expansion cards also include a so-called Miniature Card, whose size is only 38 mm×33 mm×3.5 mm, as well as a so-called SmartMedia card, whose size is only 45 mm×37 mm×0.76 mm, and an MMC card (so-called MultiMediaCard), whose size is only 32 mm×24 mm×1.4 mm.

One drawback in known card-like communication devices is the fact that during the use, being placed in an expansion card interface, particularly the antenna structure constitutes a part that protrudes from both the electronic device, the interface and the card. The interfaces often comprise a shielding cover for protecting the expansion card and the interface, which shielding cover has to be kept open when the antenna structure extends outside the electronic device. The protruding parts of the antenna structure and the card may stick in something particularly during the transportation and use of the device and may damage the card. For this reason, the card must be detached after the use and be stored separately from the device.

When the antenna structure is arranged in the card in such a way that the card fits fully inside the expansion card interface, there is a problem that the metal structures of the electronic device surrounding the card and said shielding cover considerably restrict the operating range of the card-like wireless communication device, especially the antenna, by interfering with the signal to be received and transmitted. The shielding cover may have been treated with metal paint or made of electrically conductive material, such as carbon fibre, which facts furher increase the interference and prevent the transmission of signals.

It is a purpose of the present invention to eliminate the aforementioned drawbacks by means of a card adapter according to the invention. The card adapter according to the invention is characterized in what will be presented in the characterizing part of claim 1. The method according to the invention is characterized in what will be presented in the characterizing part of claim 10. The card-like wireless communication device according to the invention is characterized in what will be presented in the characterizing part of claim 12.

It is an essential principle of the invention to allow the motion of the adapted expansion card, especially the wireless communication device, in the card adapter, so that the card can be moved in different functional positions. In the different positions, the electric contact to the card adapter as well as the connection to the electronic device are, however, retained to maintain operation. Thus, the central principle is that the aforementioned second connector means move along with the card in the adapter, and the conductor means are arranged to allow said motion.

The wireless communication device according to the invention does not have to be removed from the PC device for the time of transportation. Thus, the implementation of the PC device, the set-up of a radio connection, as well as the initialization of the wireless data transmission are expedited. At the same time the number of acts of attaching the card to the interface and detaching it from the interface is reduced, wherein the wearing of the connector means as well as failures are reduced. The card adapter according to the invention with its card constitutes an assembly, preferably with standard dimensions.

By means of the expansion card and the card adapter it is possible to produce an assembly which constitutes a card-like wireless communication device which can be supplemented in the presented simple way with a feature by means of which the antenna placed in the card can be moved in different positions. Thus, it is obvious that if the assembly is normally intented to be used as a unit, it is also possible to provide the card adapter with components necessary for the function of the wireless communication device. It is also possible to consider placing only the antenna of the wireless communication device on the card. The card adapter can also form an assembly together with the electronic device, by means of which assembly the card, especially a card-like wireless communication device with its antenna, can be movably connected to the device.

In some cases the operating range of the antenna and the card can be sufficient even though the card in its first functional position were located fully inside the interface, but by means of the invention, the card, and especially its antenna, can be moved outward from the interface into its functional position, which in many situations can be sufficient for a reliable reception of even a weak signal and for attaining a sufficient operating range. For transport, the card can be moved inward into the interface. A special advantage of the invention is that in the protruding functional position of the card, the antenna can be located in a free space outside the device. Thus, the antenna is located further off the components of the device, such as the processor of a computer, that cause radio interference. The effect of the electromagnetic interference caused by the components is reduced when the distance grows.

In expansion cards which are fitted in the adapter, the antenna can be located for example inside the card, or it can be integrated in the structures of the card, especially on the outer surfaces or in a part which is located outside the expansion card interface when the card is moved into different positions. The invention is applicable to be used especially in electronic devices suitable for low power radio frequency networks (LPRF) which can be used in wireless local area networks, such as piconets, wherein the operating distance is typically 0.1 to 10 m, even 100 m, if necessary. These wireless networks operate in the ISM range at the frequency of 2.4 GHz. The invention is suitable to be used in so-called Bluetooth technology, by means of which it is possible to replace cables with a radio channel e.g. between PC devices and peripheral devices.

Figure 2:
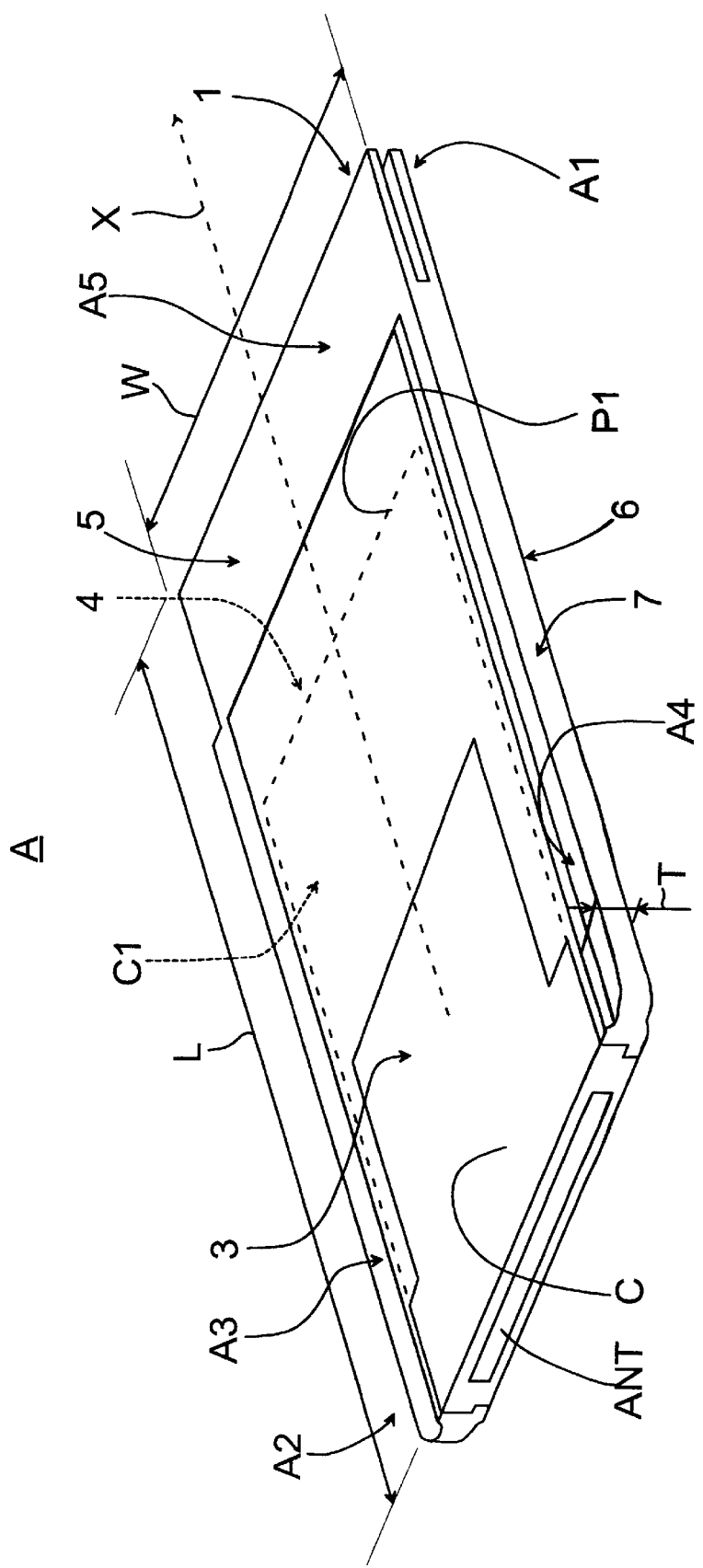
Figure 3:
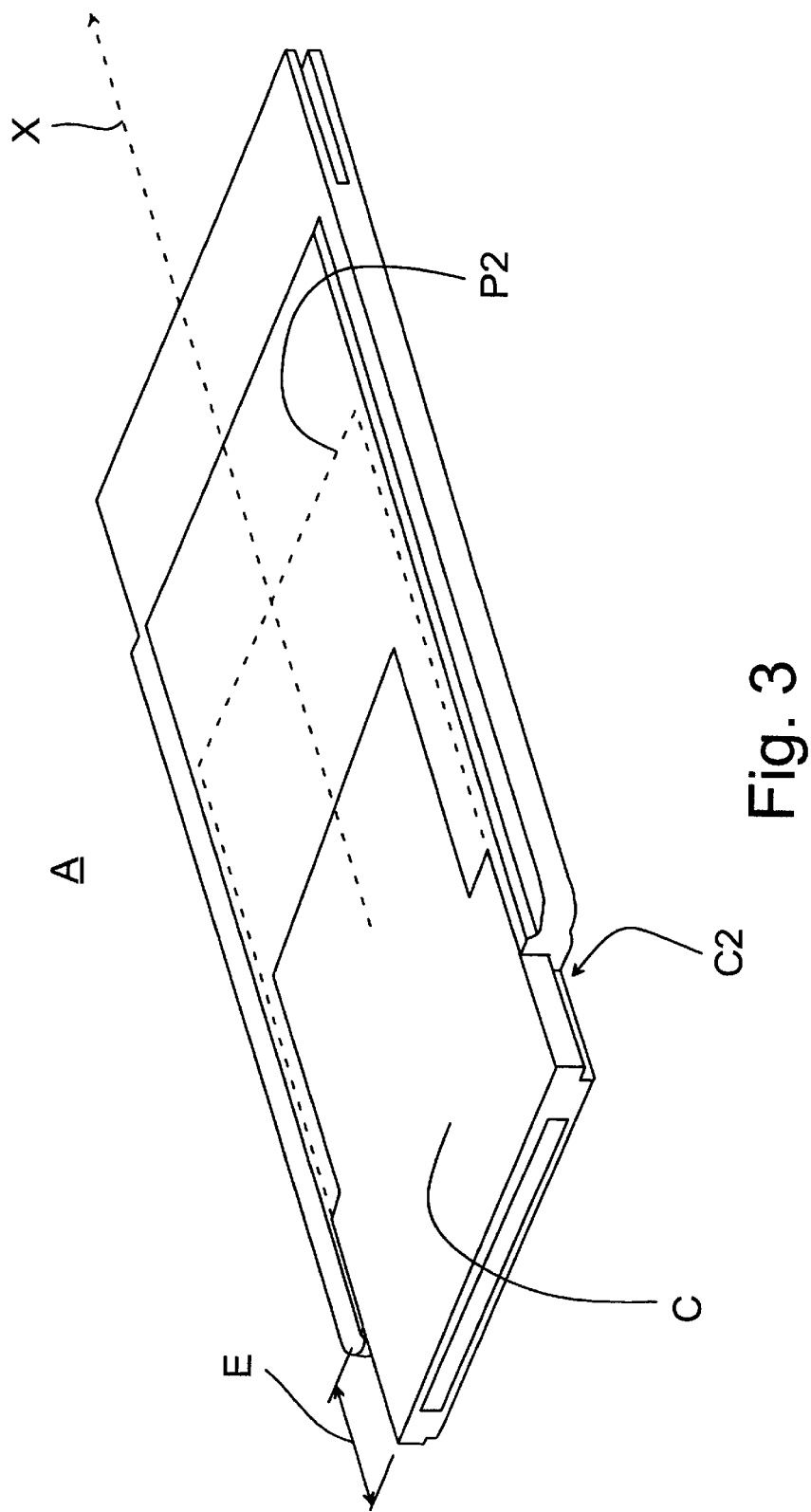
Figure 4:
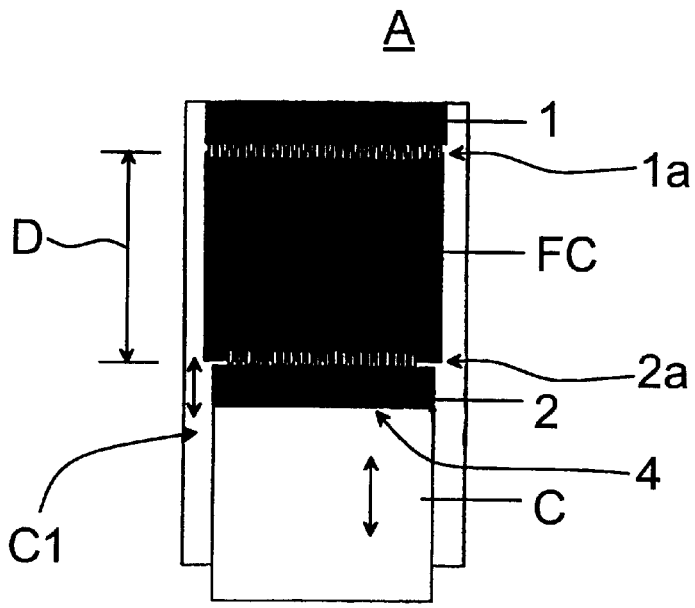
Figure 5:
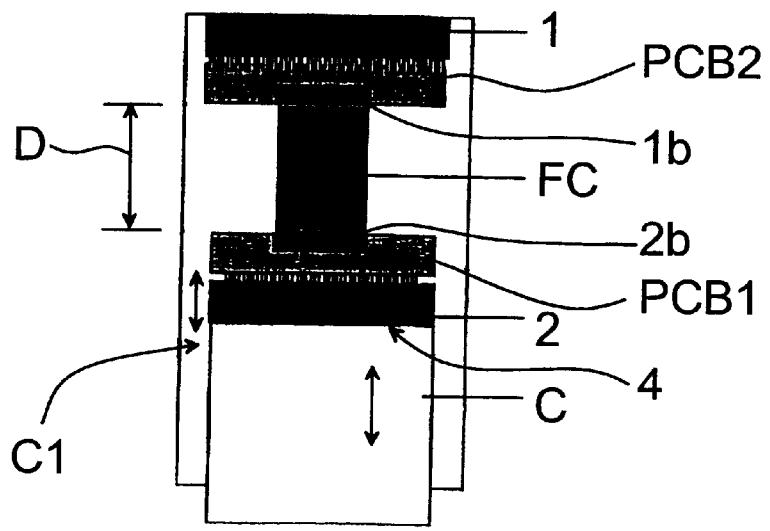
Figure 6:
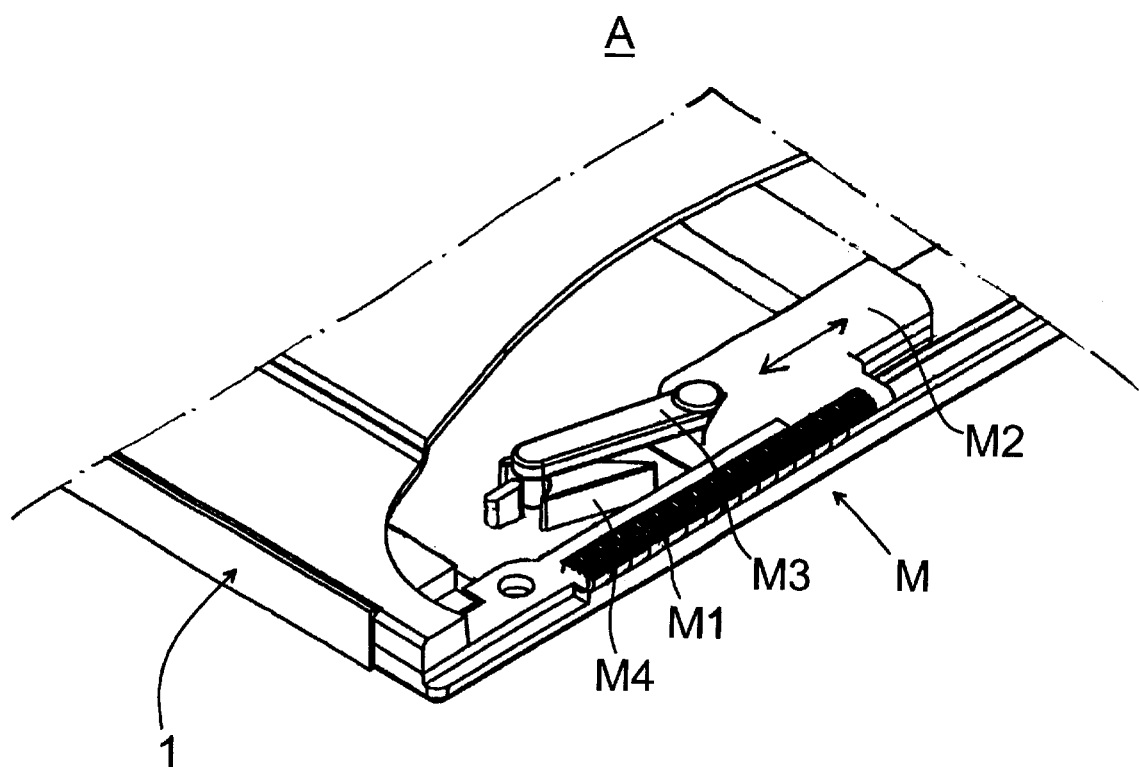

In the following, the invention will be described in more detail with reference to the appended drawings, in which:

FIG. 1    shows a card-like wireless communication device of prior art in a perspective view,
FIG. 2    shows, in a perspective view, a card adapter and an expansion card according to the invention, connected together in a first functional position of the expansion card,
FIG. 3    shows, in a perspective view, the card adapter and the expansion card of FIG. 2, connected together in a second functional position of the expansion card, -continued FIG. 4    shows a top-view of a card adapter according to a first preferred embodiment of the invention in an opened position, when the expansion card is in its second functional position,
FIG. 5    shows a top-view of a card adapter according to a second preferred embodiment of the invention in an opened position, when the expansion card is in its second functional position, and
FIG. 6    shows, in a perspective view, a part of the card adapter according to the invention in an opened position, to illustrate the transfer mechanism arranged thereto in a first functional position of the transfer mechanism.

FIG. 2 shows a card adapter A according to a preferred embodiment of the invention, the dimensions of the card adapter A complying with the PCMCIA standard. According to the PCMCIA standard, the length L of the PC card is 85.6 mm, and the width W is 54 mm. The PC cards are divided into three types, wherein the thickness T of the PC card can be 3.3 mm (type I), 5.0 mm (type II), or 10.5 mm (type III). The PC cards are designed to be placed fully inside the PC with a motion in the direction of the longitudinal axis X of the PC card, but so-called extended PC cards can be even 40 mm longer than conventional PC cards. The PC card, and thus also the card adapter A, are provided with first connector means 1 for electric coupling, i.e. with a 68-pin connector 1 according to the PCMCIA standard, by means of which the card adapter A is connected e.g. to the PC. The connector 1 is arranged in the first end A1 of the card adapter A, in a frame structure surrounding the card adapter A, especially on its end surface which is equipped with 34 openings in two rows on top of each other, into which openings the metal contact pins of the expansion card interface are fitted. The openings inside the card adapter A, in turn, are equipped with contact means which are positioned in an electric contact with the pins. A connector of a corresponding type is also shown in FIG. 1.

Further referring to FIG. 2, the second, opposite end A2 of the card adapter A is also provided with a space 3 for an expansion card C.

FIG. 2 shows the expansion card C when it is placed in the card adapter A and inserted in its first functional position P1, in which it is positioned fully inside the standard outer dimensions of the card adapter A. In the presented preferred embodiment of the invention, the expansion card C, which is preferably a card-like wireless communication device, is equipped with a CF card according to the CFA standard. The length of the CF card is 42.8 mm, the width 36.4 mm and the thickness 3.3 mm (type I) or 5 mm (type II). For electric coupling, the CF card is equipped with first connector means 4, a 50-pin connector according to the CFA standard, wherein in the frame structure edging the the card C, especially on its end surface, 25 openings are placed in two rows on top of each other. Furthermore, in the openings inside the card C, contact means are arranged, which contact means are positioned into an electrical contact with the pins. The connector means 4 are arranged in the first end C1 of the card C, which is positioned inside the adapter A.

With reference to FIG. 2, the connector 4 of the expansion card C is typically fixed on a circuit board (not shown in the drawing) placed inside the card C, which circuit board also accommodates the components essential for the functions of the card C, e.g. IC circuits and conductors for transmitting electric signals, such as radio signals between the connector means and the components. At the same time the circuit board, the components arranged on the circuit board, as well as the conductors constitute means for processing signals, such as radio signals. The expansion card C is provided with an antenna for receiving and transmitting signals, wherein the aforementioned means are electrically coupled to said antenna. Said means are electrically coupled to second connector means 2 for transmitting signals between the electronic device and the expansion card C. The electronic operating principle of the card-like wireless communication device, such as the above-mentioned card phone, is prior art known by anyone skilled in the art, and thus a detailed description is not necessary in this context.

The card adapter comprises a cover surface 5, a bottom surface 6 and a surrounding outer surface 7, which is at least partly composed of the frame structure edging the card adapter A. The cover structures can be for example formed of a thin sheet of metal with a substantially fixed thickness. The connector 1 and the frame structure are for example at least partly made of plastic, such as polyethylene (PE). It is obvious that the frame structure can comprise several separate parts, and the connector 1 can form a part of the frame structure at the same time. It is also obvious that the frame structure can simultaneously at least partly form the cover surface 5 and/or the bottom surface 6 together with the cover structures. It is obvious that the frame structure can comprise several separate parts, and the connector 1 can simultaneously form a part of the frame structure. It is also obvious that the composition of the cover structures as well as the way in which they are fixed to the frame structure can vary. The cover structures can also partly form the outer surface 7 when they extend on top of the frame structure.

In the invention, the space 3 formed in the adapter A is arranged in such a way that the card C is capable of moving in the adapter A back and forth in the direction of the longitudinal axis X of the adapter A and the card C, the card adapter A being also placed in the interface with a motion to the same direction, and removed from the interface with a motion to the opposite direction. The card C is placed in the adapter A with a motion in the direction of the axis X, wherein the space 3 is arranged to be open on one side, preferably on the second end A2 of the card adapter A. The card adapter A supports the card C on both sides by means of frame structures A3 and A4 which extend from the frame part A5 of the card adapter A. The structures A3 and A4 are also arranged in such a way that on the support of them the card C is capable of sliding towards the frame part A5, inside and out of the adapter A, and in such a way that the motion of the card C transversely in relation to the axis X is prevented. In the presented embodiment, the cover surface 5, and correspondingly also the bottom surface 6, extends partly on top of the card C, wherein it covers the connector means of the card C and the adapter A, simultaneously controlling the motion of the card C. The cover surface 5, and correspondingly also the bottom part 6, are partly open so that it is possible to grip the card C for detachment. With reference to FIGS. 2 and 3, the edges of the card C as well as the different positions P1, P2 are illustrated with a broken line.

FIG. 3 shows the expansion card C of FIG. 2 when it is inserted in the card adapter A of FIG. 2, in the protruding second functional position P2, in which it is partly located outside the standard dimensions of the card adapter A. In the direction of the axis X the card C protrudes a distance E which is smaller than the overall length of the card C. When the length of the card adapter A equals the depth of the interface, the card C also extends in its second end C2 a distance E outward from said interface. The antenna ANT of a card-like wireless communication device C is thus preferably placed on the end C2 to attain the advantages according to the invention. The antenna structure can vary, wherein it can be fixed on the surfaces of the card C, on a circuit board inside the card C or on the end C2, or it can be integrated in other structures of the card C. It is obvious that in addition to the positions P1, P2, which represent the extreme positions, the card C can also be placed into several intermediate positions, wherein the distance E also varies.

FIG. 4 illustrates a first preferred embodiment of the card adapter A. Inside the card adapter A, second connector means 2 are placed, to which the card C connects at its first end C1. The connector means 2 comprise a connector provided with pins which are positioned into corresponding openings in the connector 4 of the card C, and thus produce an electric contact to the card C. The card adapter A also comprises conductor means FC arranged inside the adapter A to produce an electric contact and to transmit signals between the second connector means 2 and the first connector means 1. The conductor means FC typically comprise several separate conductors by means of which determined contact means 1a in the connector 1 and contact means 2a in the connector 2 are connected to each other. It is obvious that some of the contact means can be left unconnected.

In a preferred embodiment, the conductor means FC are formed as a flexible, banded cable, comprising several parallel plastic-insulated conductors. According to another advantageous embodiment, the conductor means FC are formed into a flexible, printed or laminated strip, on the surface of which the necessary conductors are formed, typically in conductor patterns of copper. In the electrical couplings and attachments of the connector means to the conductor means it is possible to utilize prior art techniques. The presented connector means 1 and 2 are elongated and they are arranged transverse to the direction X.

According to another preferred embodiment, the conductor means FC are equipped with slide contacts which comprise for example a metal printing produced on a stationary circuit board, as well as with spring contacts attached to a mobile part, such as the second connector means 2, which spring contacts slide on top of the printing and are pressed against it. Alternatively, the slide contact can be formed of two elements such as cylinder pipes, placed within each other and moving with respect to each other, a galvanic, electric connection prevailing therebetween.

In the invention, the second connector means 2 are arranged to move along with the card C when the card moves in the card adapter A into different functional positions, such as positions P1 and P2, as the second connector means 2 are simultaneously connected to said expansion card C and to its connector means 4. This enables the function of the card C in different positions as well as the continuance of the function during transfers. For this purpose, the second connector means 2 are arranged to move inside the card C, for example by means of guides arranged in the frame structure of the frame part A5. For the connector means 2, end guards also have to be advantageously arranged in order to restrict the motion in the area of the measurement E according to FIG. 3, so that the connector means 2 could not be pulled out of the card along with the card C, and so that the connector means could not be pushed too deep in the adapter A with the card C.

To allow the motion of the connector means 2, the free overall length D of the conductor means FC also has to be arranged variable and in such a way that it allows a change in the overall length that equals at least the distance E. For this purpose, the conductor means FC are folded in the longitudinal direction X and arranged in the folded position in the card adapter C. According to a second embodiment, the conductor means FC are folded in such a way that the conductor means FC form at least three layers in the direction transverse to the longitudinal direction X, preferably in the direction transverse to the cover surface.

FIG. 5 illustrates a second preferred embodiment of the card adapter A, which also comprises conductor means FC and connector means 2 which are arranged to be movable. In this embodiment, the second connector means 2 are fixed e.g. on a rigid printed circuit board PCB1, on which conductor patterns are also produced by means of strip-like copper conductors. On the circuit board PCB it is also possible to place components, such as IC circuits to implement the electric function. The circuit board PCB is connected to the conductor means FC by means of the connector 2b of the connector means 2, such as a card edge connector. In the second embodiment, the first connector means 1 are also fixed for example on a rigid printed circuit board PCB2, which is connected to conductor means FC and further to second connector means 2, for example by means of a connector 1b, such as a card edge connector. Also in this case the free overall length D of the conductor means FC is to be arranged variable and in such a way that it allows a change in the overall length that equals at least the distance E. In the third embodiment of the invention, one of the circuit boards PCB is missing, wherein the coupling corresponds partly to the coupling of FIG. 4 and partly to that of FIG. 5.

FIG. 6 illustrates a transfer mechanism M which functions in a spring-like manner and is arranged to facilitate the transfer of the card C connected to the card adapter A. The mechanism M is arranged to push the card C with a spring means M1 outwards from the adapter A to the second functional position P2 of the card C. The spring means M1 is arranged inside the adapter and it affects a frame part M2. The mechanism M locks the card C in its place when the card is first pushed inward e.g. with a finger and thereafter released, i.e. the force pushing it inside is removed, wherein the card C is positioned into the first functional position P1. From this position the card C is released by pressing it first deeper in the adapter A and thereafter releasing it, wherein the card C is pushed out into the position P2 with the help of the spring means M1. By means of the mechanism M the card C can be very easily moved in the adapter A, merely by pressing the other end C2 of the card C, showing from the opening of the interface. A further advantage is that it is thus not necessary to arrange voluminous buttons, latches and locking devices in the end A2 of the adapter, by means of which the inserted card C, which tends to be pushed outwards by means of the compressed spring means, can be locked into its first functional position P1. When the lock is opened, the button is pressed, or the latch is moved, the card is capable of bouncing outwards into its position P2.

The mechanism M is connected between a stationary part of the card adapter A, such as the first connector means 1 or the frame part A5, and a movable part, such as the second connector means 2 or the circuit board PCB1. Thus, the mechanism affects the card C connected thereto via the second connector means 2, the pressings being transmitted to the second connector means 2 and further to the mechanism M by means of the card C. In the mechanism M, it is possible to utilize for example spring mechanisms, known as such e.g. from ball-point pens, wherein the attachment and the more detailed construction can differ from that shown in FIG. 6.

FIG. 6 shows an advantageous mechanism, which comprises means for setting the connector means 2 into the first position P1, which means comprise a position lever M3 which extends from the frame part M2 and is arranged to be deflected and to return in the lateral direction. The position lever M3 is arranged in a functional connection with shaped control levers M4. When the connector means 2 are inserted together with the card C, the control levers M4 are arranged to deflect said position lever M3 behind the control levers M4 into a position which prevents the card C from being pushed outward. When the card C is pushed further inside, the control levers M4 allow the position lever M3 to return past the control levers M4 and behind the same into a position, which allows said card to protrude into its second position P2. The position lever M3 remains in a non-deflected state for example by means of a spring arranged inside the frame part M2. The card adapter A is provided with a spring means M1, which tends to push out the connector means 2 and, at the same time, the card C. The position lever M3 is connected to connector means 2, and the control levers M4 are connected to the adapter A, for example to its frame structure, in a stationary manner. According to a second alternative, the position lever M3 is connected to the adapter A in a stationary manner, and the control levers M4 are connected to second connector means 2. In FIG. 6, the frame part M2 is connected to the second connector means 2, along which the frame part M2 moves.

Furthermore, it is obvious that the invention is not restricted solely to the above-presented advantageous embodiments of the invention, but it can vary within the scope of the claims.

What is claimed is:

1. A card adapter, which is arranged for placing and coupling a separate expansion card (C), such as a wireless communication device, to an expansion card interface of an electronic device, and which comprises
a first end (A1) provided with first connector means (1) for connecting to the electronic device,
a second end (A2) provided with a space (3) for placing the expansion card (C) into said card adapter (A), and
second connector means (2) for connecting the expansion card (C) placed in said space (3) to said card adapter (A), characterized in that
the second connector means (2) are arranged to move along with the expansion card (C) connected thereto, when said expansion card (C) moves into different functional positions (P1, P2) in said card adapter (A).

2. The card adapter according to claim 1, characterized in that said card adapter (A) is arranged for said expansion card (C) to move into its first functional position (P1), in which said expansion card (C) is positioned inside said expansion card interface and into its second functional position (P2), in which said expansion card (C) is positioned partly outside said expansion card interface.

3. The card adapter according to claim 1, which comprises conductor means (FC) arranged therein and connected to the second connector means (2), characterized in that said conductor means (FC) are formed as a banded, folded structure to allow the motion of the second connector means (1, 2).

4. The card adapter according to claim 1, which comprises conductor means (FC) arranged therein and connected to the second connector means (2), characterized in that said conductor means (FC) are provided with a slide contact to allow the motion of the second connector means (1, 2).

5. The card adapter according to claim 1, characterized in that the second connector means (2) comprise a circuit board (PCB1) moving along therewith.

6. The card adapter according to claim 1, characterized in that its dimensions are at least partly arranged to comply with the PCMCIA standard, and that the dimensions of said expansion card (C) are at least partly arranged to comply with the CFA standard.

7. The card adapter according to claim 1, characterized in that said card adapter (A) and said expansion card (C) constitute an assembly whose physical dimensions comply with the PCMCIA standard.

8. The card adapter according to claim 1, characterized in that a spring-like transfer mechanism is arranged therein to guide the assembly composed of the second connector means (2) and said expansion card (C) into different positions, wherein it is arranged to push said assembly (2, C) outward into the second functional position (P2), to lock said assembly (2, C), which is first inserted and then released, into the first functional position (P1), and to release said assembly (2, C), which is pushed further inside and thereafter released, to be pushed out.

9. The card adapter according to claim 1, characterized in that said expansion card (C) comprises an antenna (ANT) arranged at its second end (C2).

10. A method for placing and connecting an expansion card, such as a card-like wireless communication device, to an electronic device, in which method a card adapter is arranged in said electronic device, the card adapter comprising:

a first end (A1) provided with first connector means (1) for connecting to the electronic device, a second end (A2) provided with a space (3) for placing the expansion card (C) into said card adapter (A), and second connector means (2) for connecting the expansion card (C) placed in said space (3) to said card adapter (A), characterized in that said expansion card (C) is arranged to be moved into different functional positions (P1, P2) in said card adapter (A) in such a way that the second connector means (2) move along with the expansion card (C) connected thereto.

11. The method according to claim 10, wherein said card adapter (A) comprises conductor means (FC) arranged therein and connected to the second connector means (2), characterized in that said conductor means (FC) are formed as a banded, folded structure to allow the motion of the second connector means (1, 2).

12. A card-like wireless communication device, which comprises anexpansion card (C) and a card adapter (A) which is arranged for placing and connecting said card-like wireless communcation device to an expansion card interface of an electronic device, and which card adapter (A) comprises:

a first end (A1) provided with first connector means (1) for connecting to the electronic device, a second end (A2) provided with a space (3) for placing the expansion card (C) into said card adapter (A), and second connector means (2) for connecting the expansion card (C) placed in said space (3) to said card adapter (A), characterized in that the second connector means (2) are arranged to move along with the expansion card (C) connected thereto, when said expansion card (C) moves into different functional positions (P1, P2) in said card adapter (A).

* * * * *

UNITED STATES PATENT AND TRADEMARK OFFICE
CERTIFICATE OF CORRECTION

PATENT NO. : 6,570,767 B1
DATED : May 27, 2003
INVENTOR(S) : Vapaakoski et al.

It is certified that error appears in the above-identified patent and that said Letters Patent is hereby corrected as shown below:

<u>Title page,</u>
Item [30], please change to:
-- Aug. 10, 1999   (FI) ................................19991700 --

Signed and Sealed this

Seventh Day of October, 2003

JAMES E. ROGAN
*Director of the United States Patent and Trademark Office*